US010866826B2

(12) United States Patent
Alcorn et al.

(10) Patent No.: US 10,866,826 B2
(45) Date of Patent: Dec. 15, 2020

(54) STATE-BASED SYSTEM MANAGEMENT MIGRATION

(71) Applicant: LENOVO Enterprise Solutions (Singapore) PTE. LTD., New Tech Park (SG)

(72) Inventors: Matthew R. Alcorn, Durham, NC (US); James G. McLean, Raleigh, NC (US); Antonio Abbondanzio, Raleigh, NC (US); Fred A. Bower, Durham, NC (US)

(73) Assignee: LENOVO Enterprise Solutions (Singapore) PTE. LTD, Singapore (SG)

( * ) Notice: Subject to any disclaimer, the term of this patent is extended or adjusted under 35 U.S.C. 154(b) by 96 days.

(21) Appl. No.: 16/370,698

(22) Filed: Mar. 29, 2019

(65) Prior Publication Data

US 2020/0310856 A1 Oct. 1, 2020

(51) Int. Cl.
| | | |
|---|---|---|
| *G06F 9/455* | (2018.01) | |
| *G06F 8/65* | (2018.01) | |
| *G06F 16/903* | (2019.01) | |

(52) U.S. Cl.
CPC ............ *G06F 9/45558* (2013.01); *G06F 8/65* (2013.01); *G06F 16/903* (2019.01); *G06F 2009/4557* (2013.01); *G06F 2009/45595* (2013.01)

(58) Field of Classification Search
CPC .................................................. G06F 9/45558
(Continued)

(56) References Cited

U.S. PATENT DOCUMENTS 6,877,111 B2 * 4/2005 Sharma .................. G06F 9/465
714/13
7,302,541 B2 * 11/2007 Hirezaki ................ G06F 3/061
710/28
(Continued)

OTHER PUBLICATIONS

Sapuntzakis, Constantine P., et al. "Optimizing the migration of virtual computers." ACM SIGOPS Operating Systems Review 36.SI (2002): pp. 377-390. (Year: 2002).*
(Continued)

*Primary Examiner* — Satish Rampuria
(74) *Attorney, Agent, or Firm* — Kunzler Bean & Adamson; Bruce R. Needham

(57) ABSTRACT

A controller for state-based system management migration includes state module configured to determine a state of a data center component, an event module configured to electronically communicate with the state module and to generate a focused management migration event in response to determining that the state of the data center component corresponds to a focused management category that differs from a general management category of data center components managed by a general system management instance, a run module configured to ensure, in response to detecting the focused management migration event, that a focused system management instance configured to manage data center components having the state corresponding to the focused management category is running, and a transfer module configured to transfer, in response to detecting the focused management migration event, system management ownership of the data center component to the focused system management instance. A method and program product work similarly.

18 Claims, 6 Drawing Sheets

(58) Field of Classification Search
USPC .................................................... 718/1–108
See application file for complete search history.

(56) References Cited

U.S. PATENT DOCUMENTS

| 8,635,208 B2 * | 1/2014 | Wolf ................. G06F 16/24568 |
| | | 707/720 |
| 2006/0026587 A1 * | 2/2006 | Lemarroy ............. G06F 9/4451 |
| | | 717/170 |
| 2007/0011422 A1 * | 1/2007 | Srinivasan .............. G06F 16/50 |
| | | 711/165 |

OTHER PUBLICATIONS

Ge, Yang, Parth Malani, and Qinru Qiu. "Distributed task migration for thermal management in many-core systems." Proceedings of the 47th Design Automation Conference. 2010.pp. 579-584 (Year: 2010).*

Liu, Haikun, et al. "Live migration of virtual machine based on full system trace and replay." Proceedings of the 18th ACM international symposium on High performance distributed computing. 2009.pp. 101-110 (Year: 2009).*

* cited by examiner

STATE-BASED SYSTEM MANAGEMENT MIGRATION

FIELD

The subject matter disclosed herein relates to system management appliances and more particularly relates to state-based system management migration.

BACKGROUND

System management appliances can discover and create an inventory of data center components. Data center components including servers, storage, network switches, hyper-converged systems, and so forth, may require updates or changes in configuration patterns, operating system images, firmware updates, device drivers, and other system elements. As the number of data center components and options to be updated increases, the complexity of system management appliances also increases. Increased complexity can make system management appliances less efficient and more difficult to operate.

BRIEF SUMMARY

A controller for state-based system management migration is disclosed. A method and system also perform the functions of the controller. In one embodiment, the controller includes a state module configured to determine a state of a data center component. In the embodiment, the controller includes an event module configured to electronically communicate with the state module and to generate a focused management migration event in response to the state module determining that the state of the data center component corresponds to a focused management category that differs from a general management category of data center components managed by a general system management instance. A run module is included in the embodiment, that is configured to ensure, in response to detecting the focused management migration event, that a focused system management instance configured to manage data center components having the state corresponding to the focused management category is running. The controller of the embodiment includes a transfer module that is configured to transfer, in response to detecting the focused management migration event, system management ownership of the data center component to the focused system management instance.

A method is disclosed that includes in one embodiment, reading a state of a data center component. The method generates a focused management migration event in response to determining that the state of the data center component corresponds to a focused management category that differs from a general management category of data center components managed by a general system management instance. The method ensures, in response to detecting the focused management migration event, that a focused system management instance configured to manage a second group of one or more data center components having the state corresponding to the focused management category is running. The method transfers system management ownership of the data center component to the focused system management instance in response to detecting the focused management migration event.

A computer program product includes a non-transitory tangible computer readable medium having stored thereon computer program instructions that are configured to, when executed by a processor, cause the processor to perform operations including determining a state of a data center component, generating a focused management migration event in response to determining that the state of the data center component corresponds to a focused management category that differs from a general management category, ensuring, in response to detecting the focused management migration event, that a focused system management instance configured to manage data center components having the state corresponding to the focused management category is running, and transferring system management ownership of the data center component to the focused system management instance in response to detecting the focused management migration event.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
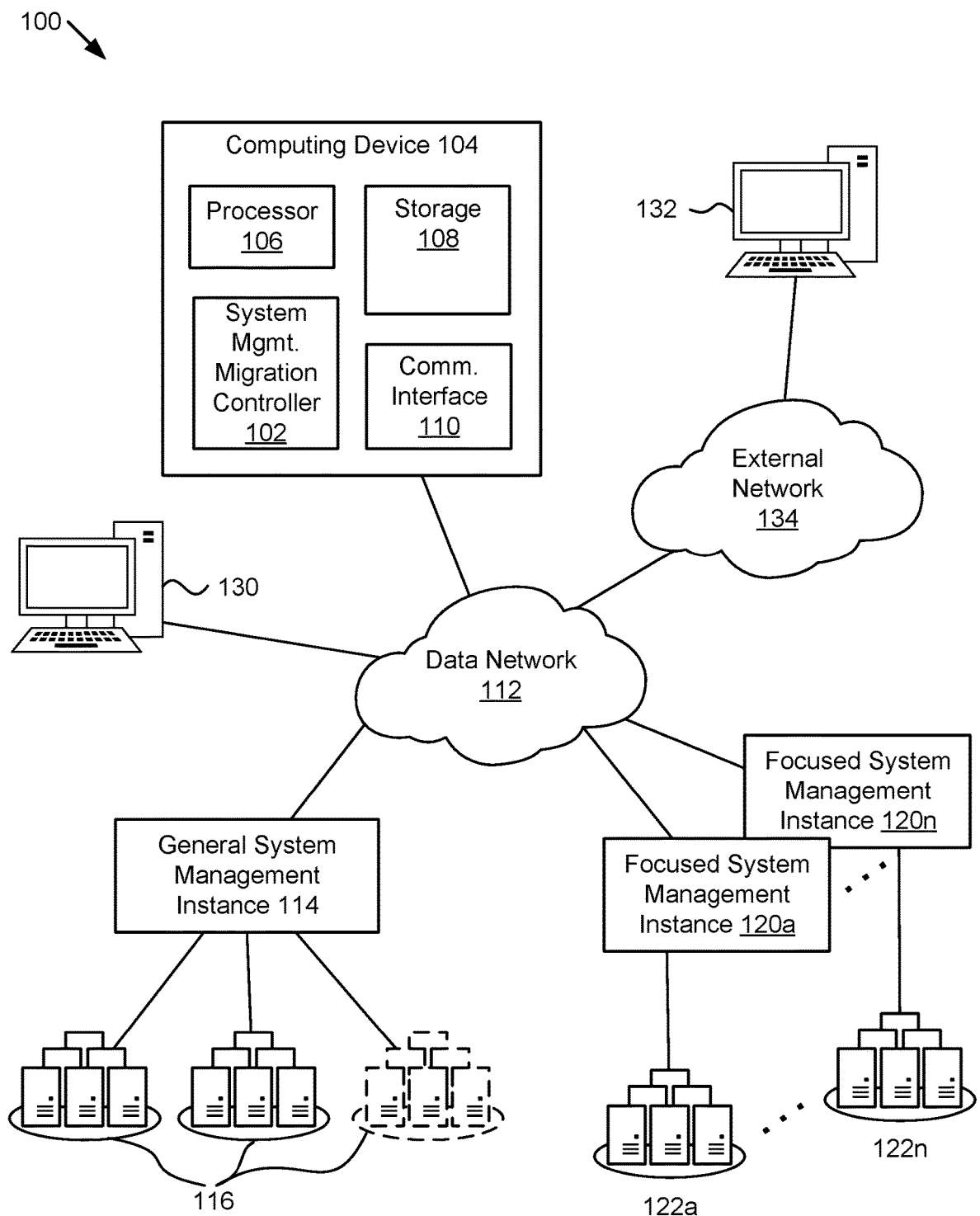
FIG. 1 is a schematic block diagram illustrating one embodiment of a system for state-based system management migration control.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a non-volatile memory ("NVMEM"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, controllers, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of controllers, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A controller for state-based system management migration includes a state module configured to determine a state of a data center component. The controller includes an event module that electronically communicates with the state module and generates a focused management migration event in response to the state module determining that the state of the data center component corresponds to a focused management category that differs from a general management category of data center components managed by a general system management instance. A run module is configured to ensure, in response to detecting the focused management migration event, that a focused system management instance configured to manage data center components having the state corresponding to the focused management category is running. A transfer module is configured to transfer, in response to detecting the focused management migration event, system management ownership of the data center component to the focused system management instance.

In certain embodiments, the event module is configured to generate a general management migration event in response to the state module determining that the state of the data center component managed by the focused system management instance corresponds to the general management category and where the transfer module is configured to transfer, in response to detecting the general management migration event, system management ownership of the data center component to the general system management instance.

In some embodiments, the focused management migration event is a first category management migration event, the focused system management instance is a first focused system management instance, and the focused management category is a first focused management category, where the event module is configured to generate a second category focused management migration event in response to the state module determining that the state of a second data center component corresponds to a second focused management category that differs from the general management category, and where the transfer module is configured to transfer, in response to detecting the second category system management migration event, system management ownership of the second data center component to the second category focused system management instance corresponding to the second focused management category.

In various embodiments, the run module is configured to ensure that the focused system management instance for focused management category is running by instantiating the focused system management instance on a virtual machine in response to determining that the focused system management instance for the focused management category is not already running.

In some embodiments, the focused management category is selected from pre-preproduction, troubleshooting, offline, throttled performance, high-priority, high-reliability, custom-configuration, temperature sensitive, and user-defined. In certain embodiments, the system management migration controller includes a mapping module that is configured to determine the focused management category to which the state of the data center component corresponds by using at least a portion of the state to query a database of focused management categories, each focused management category having at least one predetermined update action to be performed on data center components having the state corresponding to the respective focused management category.

In certain embodiments, the controller includes an update module configured to perform the at least one predetermined update action on the data center component in response to the transfer of system management ownership. In some embodiments, the at least one predetermined update action is selected from an operating system update, a driver update, a security update, a hardware configuration update, a software configuration update, a usage limitation update, a notification update, and/or a user-defined update. In some embodiments, the update module is configured to perform the at least one predetermined update action automatically in response to the transfer of system management ownership. In certain embodiments, the update module is configured to perform the at least one predetermined update action in response to an instruction from a computer system.

In some embodiments, the controller includes an access module that is configured to grant the computer system access to the focused system management instance in response to determining that the computer system is authorized to cause the update module to perform the at least one predetermined update action. In some embodiments, the computer system is a remote computer system that is configured to access the focused system management instance over a network external to a data center network.

In some embodiments, the controller includes an alert module configured to send an alert indicating that the system management ownership of the data center component is in the focused system management instance in response to the transfer module transferring ownership to of the data center component, where the alert module is configured to send the alert after the state module has read the state of the data center component, the run module has ensured that the focused system management instance is running, and the transfer module has transferred ownership of the data center component.

A method for state-based system management migration includes, in one embodiment, determining a state of a data center component. The method generates a focused management migration event in response to determining that the state of the data center component corresponds to a focused management category that differs from a general management category of data center components managed by a general system management instance. The method ensures, in response to detecting the focused management migration event, that a focused system management instance configured to manage a second group of one or more data center components having the state corresponding to the focused management category is running. The method transfers system management ownership of the data center component to the focused system management instance in response to detecting the focused management migration event.

In some embodiments, the method further includes generating a general management migration event in response to determining that the state of the data center component managed by the focused system management instance corresponds to the general management category and transferring system management ownership of the data center component to the general system management instance in response to detecting the general management migration event.

In various embodiments, ensuring that the focused system management instance for focused management category is running includes instantiating the focused system management instance on a virtual machine in response to determining that the focused system management instance for the focused management category is not already running.

In certain embodiments, the method further includes determining the focused management category to which the state of the data center component corresponds by using at least a portion of the state to query a database of focused management categories, each focused management category having at least one predetermined update action to be performed on data center components having the state corresponding to the respective focused management category. In various embodiments, the focused management category is selected from pre-preproduction, troubleshooting, offline, throttled performance, high-priority, high-reliability, custom-configuration, temperature sensitive, and user-defined.

In some embodiments, the method further includes performing at least one predetermined update action on the data center component in response to the transfer of system management ownership, where the at least one predetermined update action is selected from an operating system update, a driver update, a security update, a hardware configuration update, a software configuration update, a usage limitation update, a notification update, and/or a user-defined update.

A non-transitory tangible computer readable medium having stored thereon computer program instructions that are configured to, when executed by a processor, cause the processor to perform operations including determining a state of a data center component, generating a focused management migration event in response to determining that the state of the data center component corresponds to a focused management category that differs from a general management category, ensuring, in response to detecting the focused management migration event, that a focused system management instance configured to manage data center components having the state corresponding to the focused management category is running, and transferring system management ownership of the data center component to the focused system management instance in response to detecting the focused management migration event.

A system for state-based migration of system management includes in one embodiment one or more data center components selected from servers, storage devices, and/or network devices. The system also includes one or more processors configured to read a state of the one or more data center components. The one or more processors are further configured to generate a focused management migration event in response to the determining that the state of the one or more data center components corresponds to a focused management category that differs from a general management category. The one or more processors are further configured to ensure, in response to detecting the focused management migration event, that a focused system management instance configured to manage the one or more data center components having the state corresponding to the focused management category is running. In the embodiment, the one or more processors transfer system management ownership of the one or more data center components to the focused system management instance in response to detecting the focused management migration event.

FIG. 1 is a schematic block diagram illustrating one embodiment of a system 100 for state-based system management migration. The system 100 includes a system management migration controller 102 in a computing device 104 with one or more processors 106, storage 108, and a communications interface 110 which may include a network interface and/or an I/O interface, a data network 112, a general system management instance 114 that manages a first group of data center components 116, one or more focused system management instances 120a, . . . 120n that each manage a different group of one or more data center components e.g., 122a . . . 122n, a local computer system 130 communicatively coupled to the data network 112, and a remote computer system 132 communicatively coupled to the data network 112 over an external network 134, which are described below.

The system 100 includes a system management migration controller 102 that reads a state of the one or more data center components (e.g., 116) in the first group, generates a focused management migration event in response to determining that the state of the one or more data center components 116 corresponds to a focused management category that differs from a general management category, ensures (in response to detecting the focused management migration event that a focused system management instance e.g., 120a configured to manage the one or more data center components 116 having a state corresponding to the focused management category is running, and transfers system management ownership of the one or more data center components 116 to the focused system management instance e.g., 120a in response to detecting the focused management migration event. The system management migration controller 102 is described in more detail with regard to the controllers 200, 300 of FIGS. 2 and 3.

The system 100 includes a computing device 104, which may be an embedded computer, a server, a desktop computer, a laptop computer, a tablet computer, a workstation, a mainframe computer, a smart phone, or other computing device. The computing device 104 includes storage 108 which in certain embodiments includes RAM, nonvolatile memory, solid-state drive ("SSD"), hard disk drive ("HDD"), and/or any combination other electronic storage for storing program code/instructions, firmware, state information, and the like. The computing device 104 includes one or more processors 106 that are configured to access program code and data from memory within storage 108. The computing device 104 includes a communications interface 110 that in one embodiment, electronically communicates over data network 112. In some embodiments, the communications interface 110 also includes I/O interfaces to accessories, displays, or other I/O devices external to the computing device 104.

The data network 112, in one embodiment, includes a digital communication network that transmits digital communications. In various embodiments, data network 112 includes a wireless network, such as a wireless cellular network, a local wireless network, such as a Wi-Fi network, a Bluetooth® network, a near-field communication ("NFC") network, an ad hoc network, and/or the like. The data network 112 in some embodiments includes a wide area network ("WAN"), a storage area network ("SAN"), a local area network ("LAN"), an optical fiber network, the internet, and/or another digital communication network. In certain embodiments, the data network 112 includes one or more servers, routers, switches, and/or other networking equipment. The data network 112, in some embodiments, also includes one or more computer readable storage media, such as a hard disk drive, an optical drive, non-volatile memory, RAM, or the like.

In one embodiment, a general system management instance 114 is configured to manage the first group of the one or more data center components 116 corresponding to a general management category. In some embodiments, the general system management instance runs as a system management appliance which may run as a stand-alone system, a cloud-based application, an application on a server, or may run in distributed fashion on a combination of hardware and software systems. In some embodiments, the general system management instance 114 is instantiated to run on a virtual machine. In certain embodiments, the general system management instance 114 may be embodied within or coupled to a baseboard management controller ("BMC").

In various embodiments, the system 100 includes one or more focused system management instances 120 (which may be referred to individually as 120a, . . . 120n) that are configured to manage one or more groups of data center components 122 (which may be referred to individually as 122a, . . . 122n) corresponding to a focused management category. In various embodiments, more than one general system management instance 114 may be included and more than one of the one or more focused system management instances 120 may correspond to a particular focused management category. The general management category and the focused management categories are described in more detail with regard to the controllers 200, 300 of FIGS. 2 and 3.

In certain embodiments, the general system management instances 114 and the focused system management instances 120 may operate at the BMC level. Also, any system management instance e.g. 114, 120 may communicate with a hypervisor, server, or other data center component so as to provide information and/or recommended update actions related to ongoing operational functions. For example, a focused system management instance e.g., 120a operating at the BMC level may indicate that shifting an operational workload to a different set of servers or storage enclosures would have a beneficial effect without the focused system management instance 120a directly performing an update action to accomplish the shifting. The ability to configure certain update actions to be automatically performed and other update actions to be performed semi-automatically in response to an instruction from a local computer system or a remote computer system improves the flexibility and precision of the system management.

In certain embodiments, the one or more data center components 116 include servers, storage devices, and network devices. In various embodiments, the servers include bare metal servers also known as single-tenant physical servers, cloud hosted servers, virtual servers, hyperconverged platforms, etc. In some embodiments, the storage devices include storage racks, storage enclosures, rotating media hard disk drives, solid-state drives, and so forth. The network devices, in certain embodiments, include switches, routers, network controllers, and the like. It may be noted that the data center components 116, 122a, . . . 122n need not be housed in the same physical location.

In certain embodiments, the system 100 includes a local computer system 130 (different from computing device 104) that is communicatively coupled to the data network 112. In some embodiments, the remote computer system 132 is communicatively coupled to the data network 112 through an external network 134. In some embodiments, the external network 134 has access to the data network 112 as authorized. The terms "local" and "remote" as used herein may refer to physical proximity or remoteness and/or logical or network proximity or remoteness. For example, a computer system that communicates with the data network 112 using a virtual private network ("VPN") may be physically remote but may herein be referred to as a local computer system 130 because the network access is treated as local. Likewise, a laptop used by a manufacturer's representative may be logged into a guest account onsite at a data center and be referred to herein as a remote computer system 132 because the network access is treated as remote.

Figure 2:
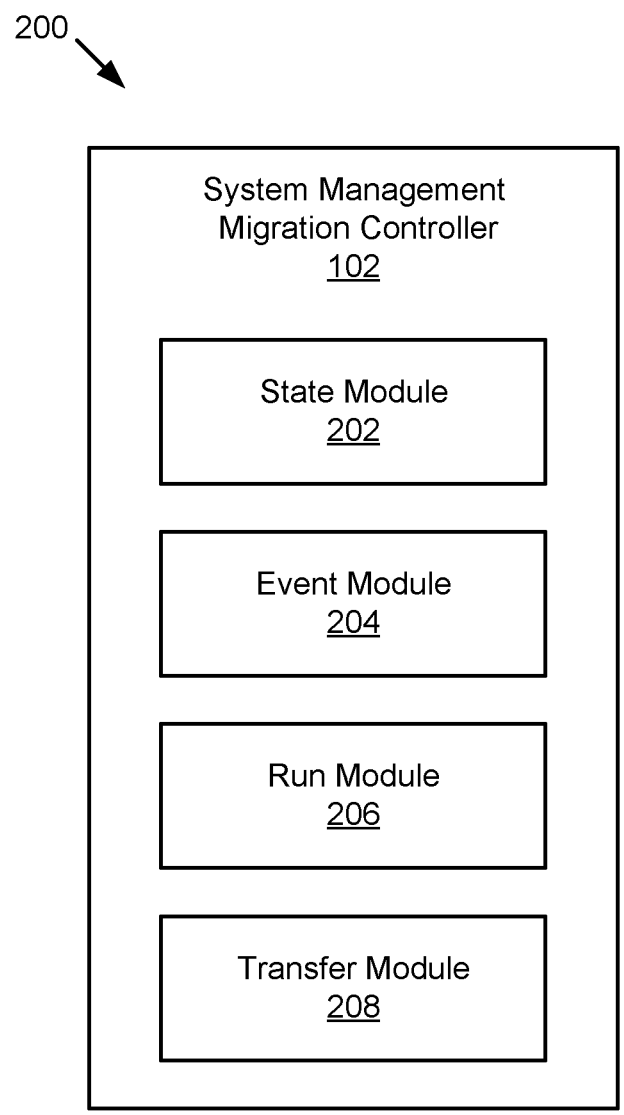
FIG. 2 is a schematic block diagram illustrating one embodiment of a controller for state-based system management migration.

FIG. 2 is a schematic block diagram illustrating one embodiment of a controller 200 for state-based system management migration. The controller 200 includes an embodiment of a system management migration controller 102 with a state module 202, an event module 204, a run module 206, and a transfer module 208, which are described below.

The controller 200 includes a state module 202 configured to determine the state of a data center component. In one embodiment, reading the state of the data center component includes reading sensors that indicate the environmental status of the data center components, such as for example, chassis temperature, chassis fan speed, processor temperature, processor fan speed, and so forth. In some embodiments, reading the state of the data center component includes reading one or more power states such as on, off, shutting down, standby, hibernate, unknown, etc. In various embodiments, reading the state of the data center component includes reading a provisioning state, a hardware configuration state, a driver state, a security state, a software configuration state, a usage limitation states such as throttling, and so forth. In other words, in various embodiments, the state module 202 is configurable to read any hardware, software, and/or environmental conditions that relate to the state of one or more selected data center components e.g., 116, 122a, . . . 122n. For example, in some embodiments, the state module 202 is configured to determine states related to errors reported to a server, a virtual machine, or other physical or virtual computing device. Such errors can include hardware errors, software faults, configuration errors inconsistent policies, and so forth.

In other embodiments, the state module 202 is configured to determine states that do not correspond to errors but which to correspond to focused management categories. For example, a particular group of servers may have a state that does not correspond to a general management category because a user of the group of servers chooses not to install the most recent version of an application until the user determines that the application is stable or until the user determines that the technical benefits of installing the most recent version of the application outweigh the cost of purchasing licenses for the most recent version of the application.

In one embodiment, the controller 200 includes an event module 204 that electronically communicates with the state module 202 and generates a focused management migration event in response to the state module 202 determining that the state of the data center component (e.g., 116, 122a, . . . 122n) corresponds to a focused management category that differs from a general management category of data center components managed by a general system management instance 114. In some embodiments, the event module 204 monitors and/or generates alerts. In certain embodiments, alerts are hardware or management conditions that require investigation and some kind of update action. In various embodiments, the event module 204 polls the managed devices asynchronously and displays alerts that are received from those devices.

In various embodiments, the event module 204 creates or adds to an event log that identifies the event or class of events. The event log in certain embodiments, includes a string that indicates the data center system, product, and/or component where the event originates. In some embodiments, the event log identifies the severity of an event, e.g., informational (does not trigger an update action), warning (update action may be deferred), minor error, major error, critical error, and/or fatal error.

The event module 204 improves event monitoring and response by including new types of events including general system management migration events and focused system management events that trigger system management ownership transfer to provide more efficient and effective responses that address needed update actions automatically or semi-automatically.

For example, a data center user that is preparing to launch a new hardware product or a new software product can define two focused management categories that provides two focused system management instances e.g., 120a, 120n for managing troubleshooting issues that arise during alpha testing or beta testing of the new product. In the example, the first focused system management instance 120a can be used to manage data center components in which an issue has been identified but not yet resolved.

If the event module 204 generates a focused system management migration event in response to detecting a state corresponding to a focused management category relating to the alpha or beta testing for which an update action has been determined that addresses the identified issue, the first focused system management instance 120a can perform the update action which in turn, causes the state to change to a state that is ready for continued testing. This state change is then determined by the state module 202 and in response, the event module 204 generates a second focused management migration event to automatically transfer system management ownership to the second focused management instance 120n for performing continued monitoring of the new product until another issue is identified which triggers another system management migration event and corresponding automatic transfer of system management ownership back to the first focused management instance 120a for additional troubleshooting.

In some embodiments, the update actions are configured to be performed semi-automatically in response to the event module 204 generating a focused system management migration event to a focused management category in which the one or more update actions are to be performed in response to an instruction from a local computer system (e.g., 130) or a remote computer system (e.g., 132). For certain categories of focused system management events, it may be beneficial to have semi-automatic system management migration so the local computer system 130 or the remote computer system 132 can receive notification of the pending migration and can further provide input as to which predetermined update action to perform in response to a particular state.

In some embodiments, the focused management migration event is configured to be monitored by a run module 206 that is configured to ensure, in response to detecting the focused management migration event, that a focused management instance e.g., 120a is running, in which the focused system management instance 120a is configured to manage data center components having the state corresponding to the focused management category. In other words, if the run module 206 detects a focused management migration event, it first checks to see whether or not a focused system management instance is already running and configured to manage data center components having the state corresponding to that particular focused management category.

For example, if the general management category is defined as a "normal" state, and the state module determines that the data center component being managed by the general system management instance 114 has changed states to a state corresponding to a high temperature state, the event module 204 communicates with the state module 202 and generates a focused management migration event and the run module 206 checks to see whether a focused system management instance 122n is configured to manage data center components having a state corresponding to the "high temperature" focused management category. If no focused system management instance 120a corresponding to the determined state is running, the run module 206 is configured to ensure that it is running by instantiating, creating, starting up, or otherwise causing such a focused system management instance to run.

In certain embodiments, the run module 206 is configured to ensure that the focused system management instance e.g., 120*n* is running by instantiating the focused system management instance e.g., 120*n* on a virtual machine in response to determining that the focused system management instance for the focused management category e.g., the "high temperature" category is not already running. Beneficially, instantiating one or more focused system management instances 120 on a virtual machine enables specialized resources in the form of focused system management instances to be deployed efficiently as the need arises.

In one embodiment, the controller 200 includes a transfer module 208 configured to transfer, in response to detecting the focused management migration event, system management ownership of the data center component e.g., 122*n*, to the focused system management instance e.g., 122*n*.

For example, in various embodiments, the event module 204 is configured to generate a general management migration event in response to the state module 202 determining that the state of the data center component e.g., 122*n* managed by the focused system management instance e.g., 120*n* corresponds to the general management category. The transfer module 208 is configured to transfer, in response to detecting the general management migration event, system management ownership of the data center component to the general system management instance 114. As used herein, the term "system management event" is preceded by a word such as "general," "focused," or "different focused," to indicate to which category of system management instance the system management ownership is being transferred. The system management instance e.g., general or focused, to which ownership is transferred is optimally used to manage the one or more data center components for which is has ownership.

For example, if the state of a particular data center component, e.g., 116*a*, such as a server is being managed by the general system management instance 114 and the state module 202 determines that the server has a state corresponding to a focused management category of "high temperature" the focused management migration event causes the run module to ensure that a focused system management instance 120*a* is configured to manage data center components having a high-temperature problem. Once that problem is corrected, the state of the server no longer corresponds to a high-temperature state and the transfer module 208 transfers system management ownership back to the general system management instance 114.

Similarly, in certain embodiments, the event module 204 is configured to generate a second focused system management migration event in response to the state module 202 determining that the state of the data center component 122*a* and managed by the focused system management instance 120*a* corresponds to a second focused management category and the transfer module 208, in response to detecting the second focused management migration event, transfers system management ownership of the data center component 122*a* to a second focused system management instance 120*n* corresponding to the second focused management category.

In other words, in addition to transferring system management ownership from the general system management instance 114 to a focused system management instance 120*a* and back again to the general system management instance 114 in response to a state-based system management migration event, the transfer module 208 is also configurable to transfer system management ownership from a first focused system management instance 120*a* to a second focused system management instance 120*n*, in response to a second state-based focused system migration event that differs from a focused system migration event from a general management category.

In various embodiments, the transfer module 208 may be configured to automatically transfer system ownership of the data center component e.g., 116, 122*a*, . . . 122*n*, among the general system management instance 114, a first focused system management instance 120*a*, and a second focused system management instance 120*n* in response to a state-based system management migration event corresponding to a particular category. In other embodiments, the transfer module 208 is configured to perform such system management migrations semi-automatically in response to an instruction from a computer system, such as for example, the local computer system 130 or the remote computer system 132.

If the appropriate focused system management instance e.g., 120*a*, is already running, then the system management ownership may be transferred as described below. If the appropriate focused system management instance e.g., 120*a*, is not already running then the run module 206 is configured to ensure that focused system management instance e.g., 120*a* is running, for example by instantiating the new focused system management instance e.g., 120*a* to run on a virtual machine, on a server, or on a similar computing device.

Existing system management appliances and/or applications are typically configured to manage all types of hardware and software data center components in a complex one-size-fits-all type approach. Beneficially, the system management migration controller 102 improves the structure and functions of the one or more data center components 116 managed by the general system management instance 114 by transferring or migrating system management ownership automatically or semi-automatically in response to an instruction from a computer system to the system management instance e.g. 114, 120*a*, . . . 120*n* that is best suited to perform the appropriate system management functions for the data center components having a certain state at a particular time.

In certain embodiments, the system management migration controller 102 is configured to migrate system management ownership from a first focused system management instance 120*a* to a second focused system management instance 120*n* reducing the complexity of the general system management instance, which in turn allows more data center components 116 to be managed more efficiently by the general system management instance.

Figure 3:
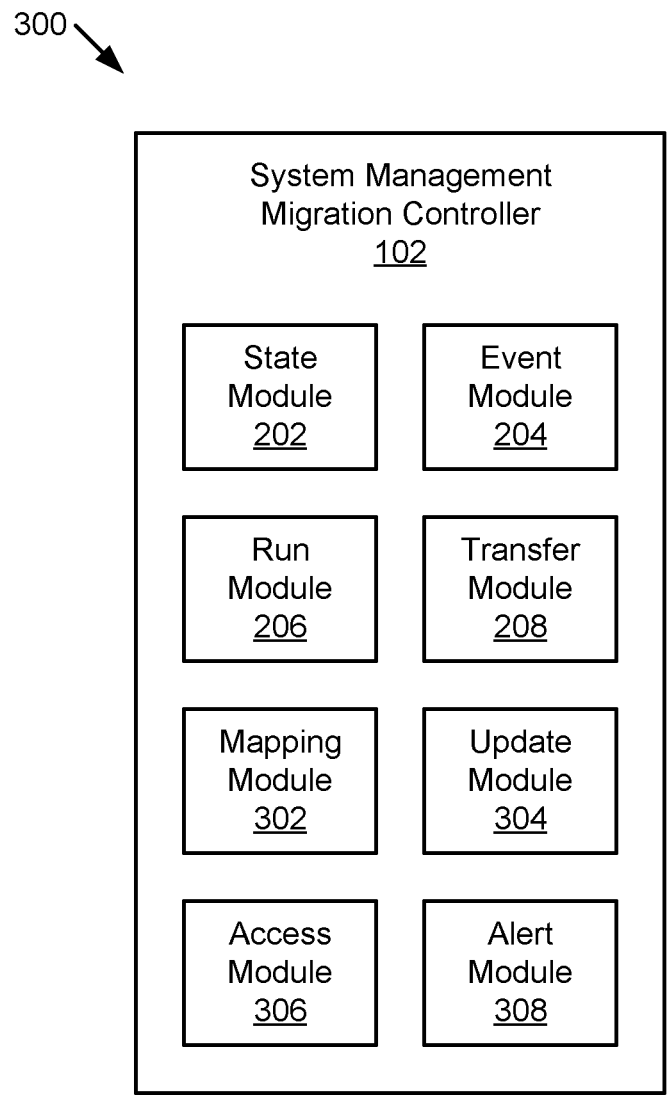
FIG. 3 is a schematic block diagram illustrating another embodiment of a controller for state-based system management migration.

FIG. 3 is a schematic block diagram illustrating another embodiment of a controller 300 for state-based system management migration. The controller 300 includes another embodiment of the system management migration controller 102 with a state module 202, an event module 204, a run module 206, and a transfer module 208, which are substantially similar to those of the controller 200 of FIG. 2. The controller 300 in various embodiments, also includes a mapping module 302, an update module 304, and access module 306, and an alert module 308, which are described below.

In one embodiment, the controller 300 includes a mapping module 302 configured to determine the focused management category to which the state of the data center component corresponds by using the least a portion of the state to query a database of focused management categories, each focused management category having at least one predetermined update action to be performed on data center components having the state corresponding to the focused management category. For example, a server with a processor that is operating at a higher temperature than expected or specified may have a predetermined update action to be performed in order to reduce the temperature. Similarly, a solid-state drive that is reaching a critical juncture in its useful lifetime e.g., 20% of useful life remaining may have a predetermined update action to change the wear leveling algorithm or to schedule a replacement of the solid state drive before it is likely to wear out.

In some embodiments, certain focused management categories are broadly defined and in other embodiments, some focused management categories are less broadly defined. A broadly defined management category may map to several states determined by the state module 202. For example, assume the state module 202 determines that the state of a data center component 116 as having an abnormally high temperature of the processor, a high fan speed, a software fault, a warning regarding the wear out status of the SSD, etc., which all may map to a focused system management instance 120a corresponding to a "troubleshooting category" where the focused system management instance 120a is used to provide additional troubleshooting information about the two portions of the state that generated the various types of events that may be related or may be unrelated. In other embodiments, the event module 204 generates two events which are mapped by the mapping module 302 to two different management categories so that different update actions may be performed in a prioritized order.

In one embodiment, the system management migration controller 102 includes an update module 304 configured to perform at least one predetermined update action on the data center component in response to the transfer of system management ownership. Continuing the preceding example, in some embodiments, the update module 304 is configured to first perform an update action related to the high temperature of the processor such as for example increasing the fan speed, comparing the processor temperature to the temperature of other components in the system, notifying a maintenance system that the filter in the cooling system should be cleaned or replaced, and the like, based on a predetermined rule to deal with overtemperature issues as a higher priority than storage wear out issues which are not likely to cause an imminent failure. The update module 304 is configured to then perform the second update action, such as indicating to a computer system e.g., 130, that the solid-state drive should be swapped out during an upcoming scheduled maintenance, or indicating that loading of the solid-state drive should be distributed more efficiently or reallocated to a different solid-state drive.

In some embodiments, the at least one predetermined update action is selected from an operating system update, driver update, security update, hardware configuration update, a software configuration update, a usage limitation update, a notification update, user-defined update, and so forth. For example, assume that a user of a particular data center component such as the server is operating in a throttled state i.e. at intentionally operating at less than its potential performance capacity. If it is determined to change the server to a non-throttled state i.e. to utilize more of the server's performance capacity, the update module 304 is configured to perform an update action configured to change the state of the server thereby generating a system management migration events configured to cause the transfer module to transfer system management ownership from the focused management instance that manages throttled servers to the general system management instance 114 which manages data center components that are in a "normal" state.

In various embodiments, by grouping systems that are in the "normal" state under management of the general system management instance 114, updates can be limited to those updates that can be appropriately made without interrupting continued function in that state e.g., an operational/production state. In the above example, transferring system management ownership of a system that is functioning normally but is being throttled (and is therefore being managed by a focused system management instance for throttled servers) to the general system management instance 114 could be performed without interrupting the operation of the system being transferred or the other systems in the general management category.

In certain embodiments, the system management migration controller 102 includes an access module 306 configured to grant computer system access to the focused system management instance in response to determining that the computer system is authorized to cause the update module to perform the at least one predetermined update action. For example, in some embodiments, a particular update action or task associated with system management may be beneficially performed in response to an instruction from a remote computer system 132 that accesses the focused system management instance e.g. 120a over an external network 134 that is external to the data network 112 of the data center. Using an access module 306 to grant computer system access to systems that are authorized to access the focused system management instance, improves the security of the data center and reduces the likelihood that unnecessary or unauthorized update actions will be performed on one or more data center components.

In one embodiment, the system management migration controller 102 includes an alert module 308 configured to send an alert that the system management ownership of the data center component is in the focused system management instance, in response to the transfer module transferring system management ownership of the data center component, where the state module 202 is configured to determine the state of the data center component, the run module 206 is configured to ensure that the focused system management instance is running, and the transfer module 208 has transferred system management ownership of the data center component prior to the alert being sent. For example, assume a situation in which a state of the data center component such as the server corresponds to a focused management category for specialist troubleshooting by a manufacturer of the server.

The alert module 308, in some embodiments, is configured to send an alert to the manufacturer indicating the system ownership has been transferred so that the manufacturer may perform the appropriate predetermined update action. In various embodiments, the alert module 308 is also configured to send an alert to a local computer system e.g. 130 indicating that the system management migration has occurred as authorized. By alerting, one or more local and/or external computer systems, the alert module improves the ability of the local computer system and the remote computer system to respond appropriately in performing needed update actions and to know at any point in time where system management ownership of the data center component (e.g., the server) resides.

Figure 4:
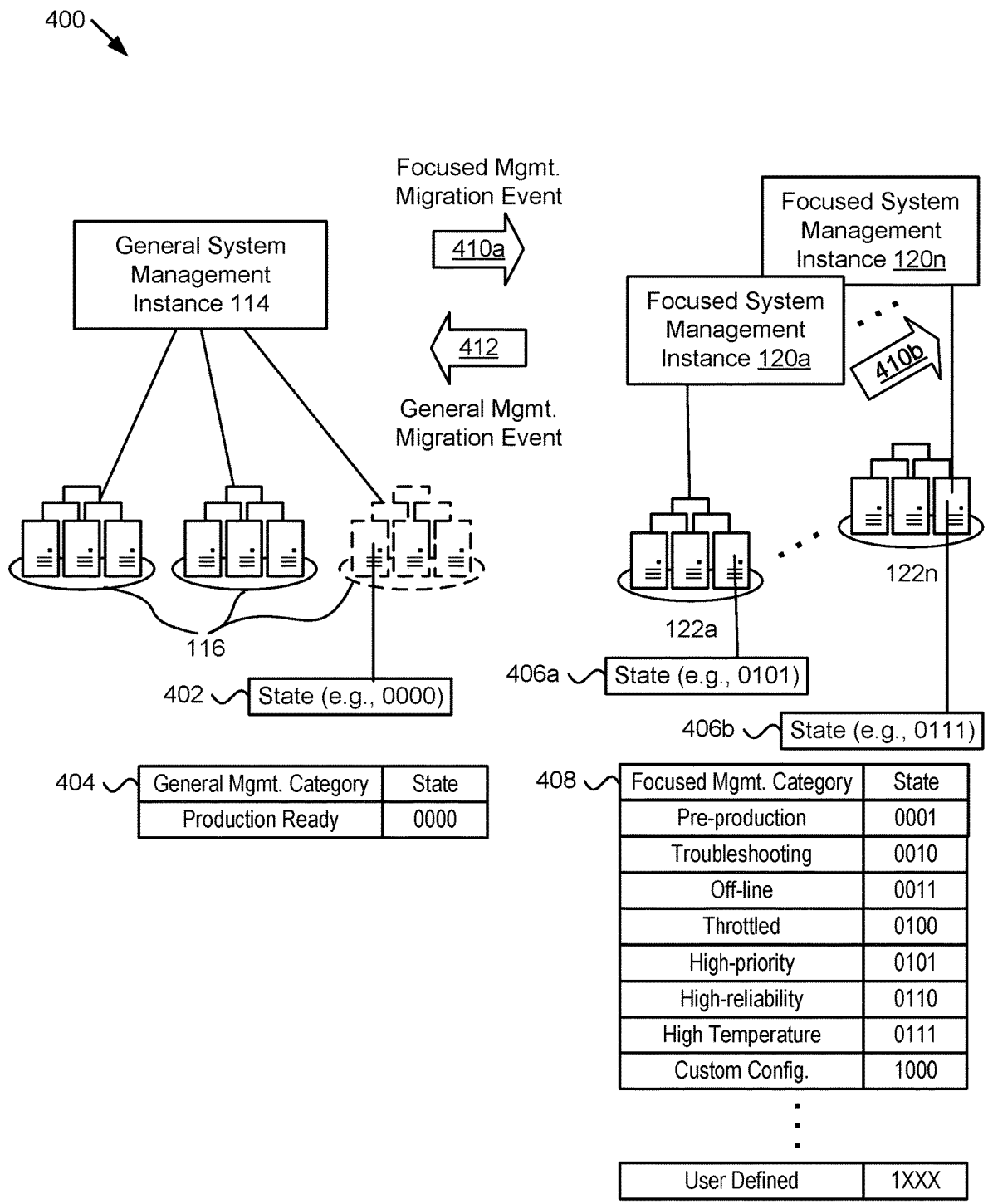
FIG. 4 is a schematic block diagram illustrating another embodiment of a controller for state-based system management migration.

Referring now to FIG. 4 and also to FIG. 1, FIG. 4 is a schematic block diagram illustrating an example 400 of state-based system management migration. In some embodiments, as depicted in the example, a general system management instance 114 manages a group of data center components 116 such as servers, storage devices, network devices, and so forth. One or more data center components 116 are managed by the general system management instance 114 and have a state 402 that corresponds to a general management category 404. For example, data center components such as servers can be in a normal operational state meaning that the systems are operational for general use, have no particular error states currently indicated, are provisioned and configured with the appropriate operating system, drivers, and software and so forth for general use.

The system management migration controller 102 monitors the state 402 of the one or more data center components 116. In FIG. 4, the state 402 is depicted as a set of binary digits for simplicity and to illustrate that the portions of the state are read from hardware in certain embodiments. In various embodiments, the state 402 can be a multipart data structure with different portions of the state corresponding to different management categories. If the state 402 changes so that it no longer corresponds to the general management category 404, and now corresponds to a state 406a which corresponds to a focused management category 408 such as "high priority" the event module 204 of the system management migration controller generates a focused management migration event 410a.

In response to the focused management migration event 410a, the run module 206 of the system management migration controller 102 is configured to ensure that a focused system management instance 120a is running. If it is not already running, the run module 206 instantiates a focused system management instance 120a that corresponds to the high priority focused management category. The "high priority" category indicates that the data center components being managed by that focused system management instance are to be managed with a high priority of responsiveness. For example, a server which is used to process real-time financial transactions may require system management with higher responsiveness than would be required of data center components in the general management category.

Accordingly, the focused system management instance 120a may perform one or more predetermined updates to ensure that the requirements for the high priority focused management category are met. For instance, special monitoring hardware or software may be provisioned to the data center components to improve performance. In some embodiments, the data center component 122a may progress through a progressive series of states where the focused system management instance corresponding to each category performs an update action which changes the state to the next category in the progressive series of states.

If the data center component e.g., 116, 122a generates a hardware alert or other signal indicating an error or a possible risk to operational within the high priority category, the state module 202 may determine that the state 406 a has changed to a different state 406b indicating for example the presence of an abnormally high temperature. As described above, a high temperature state may generate a focused system management migration event 410b that transfers system management ownership to a focused system management instance 120a that is especially configured to manage systems with temperature related sensitivities.

In certain embodiment, the alert module 308 of the system management migration controller 102 is configured to send an alert notifying a local computer system 130 or a remote computer system 132 of the temperature-related focused management migration and the update module 304 is configured to perform an automated update action such as increasing the fan speed, sending an instruction to a cooling unit to reduce the temperature, scheduling more detailed temperature monitoring and so forth, or replacing the data center component with new hardware designed to reduce the temperature related issue.

When the update module 304 has performed the predetermined update action for the data center component e.g., 120a, if the temperature becomes cool enough again and the system is ready to return to the group of data center components managed by a focused system management instance for the "high priority" category, the state module 202 determines that the state again corresponds to the state for focused management category 408 of high priority but does not correspond to the troubleshooting or temperature issues focused management category 408, and the event module 204 will again be configured to generate a focused system management event configured to cause the transfer module 208 to transfer system management ownership back to the high-priority focused system management instance.

Alternatively, if the data center component was overheating because it was not intended to operate in the high priority environment, the state module 202 may determine that the particular configuration of the data center component corresponds to the general management category but not to the high priority focused category and the event module 204 may generate a general management migration event 412 and in response, the transfer module 208 may transfer system ownership back to the general system management instance 114.

In various embodiments, the update action may be an operating system update, a driver update, a security update, a hardware configuration update, a software configuration update, a usage limitation update, a notification update, a user-defined update, and the like. The foregoing lists of focused management categories and predetermined update actions associated with one or more of the focused management categories are intended as examples and may also include other categories and other predetermined update actions not expressly listed which a person of skill in the art would recognize as suitable for a given state of the data center component.

In certain embodiments, each focused system management instance (e.g., 120n) is specialized and/or configurable to provide an efficient way of managing groups of one or more data center components requiring a common set of at least one predetermined update actions. Additionally, because each focused system management instance 120a is focused, it can be less complex and more efficient. Hence the system management migration controller 102 improves system management technology for data center components as well as improving the structure and function of the one or more data center components 122 managed by each of the focused system management instances 120 by providing focused system management which ensures that suitable updates for each particular focused management category 408 are made without interrupting or tying up data center components in a second focused management category 408 or in the general management category.

For example, if the focused system category of the group corresponds to new servers that have not been put in to production i.e. are not configured to handle a normal operational workload of the data center, the at least one predetermined update action may include storage configuration updates, operating system image updates, firmware updates, device driver updates, and so forth, as necessary to prepare the new servers for production use i.e. handling a normal operational workload of data center.

Figure 5:
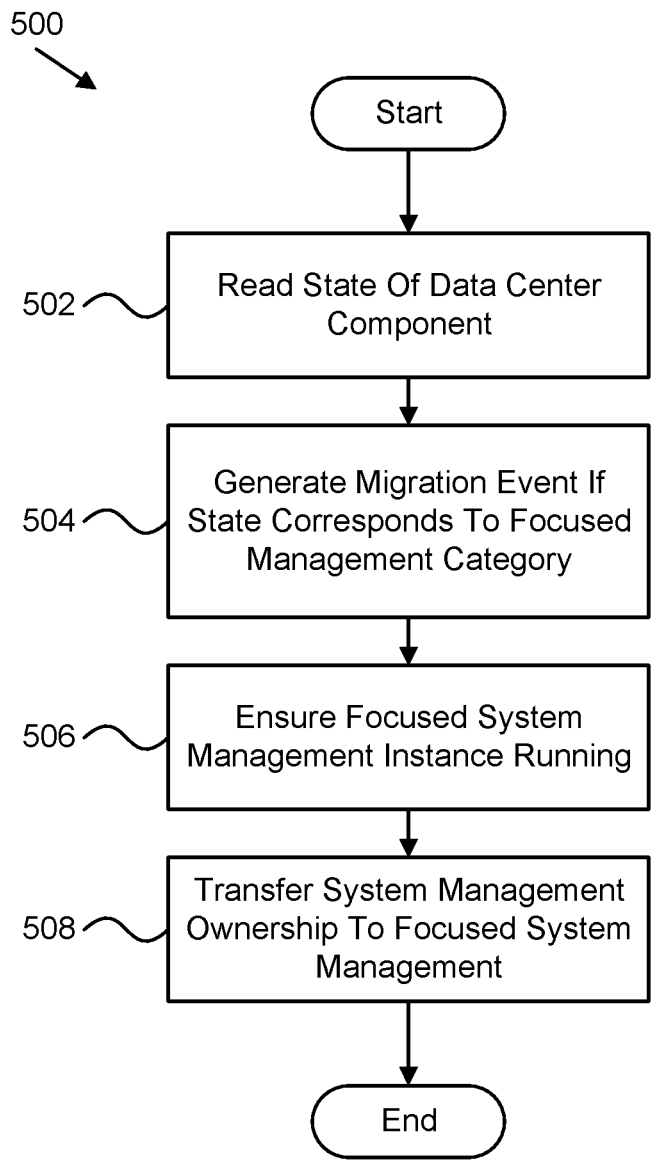
FIG. 5 is a schematic flow chart diagram illustrating one embodiment of a method for state-based system management migration.

FIG. 5 is a schematic flow chart diagram illustrating one embodiment of a method for state-based system management migration. In one embodiment, the method 500 begins and determines 502 a state of a data center component. The method 500 generates 504 a focused management migration event in response to determining that the state of the data center component corresponds to a focused management category that differs from a general management judgment category of the data center components managed by a general system management instance. The method 500 ensures 506 in response to detecting the focused management migration event that a focused system management instance configured to manage data center components having a state corresponding to the focused management category is running. The method 500 transfers 508 system management ownership to the focused system management instance in response to detecting the focused management migration event. All or portions of the steps of the method 500 may be implemented using the state module 202, the event module 204, the run module 206, the transfer module 208, the mapping module 302, the update module 304, the access module 306, and/or the alert module 308.

Figure 6:
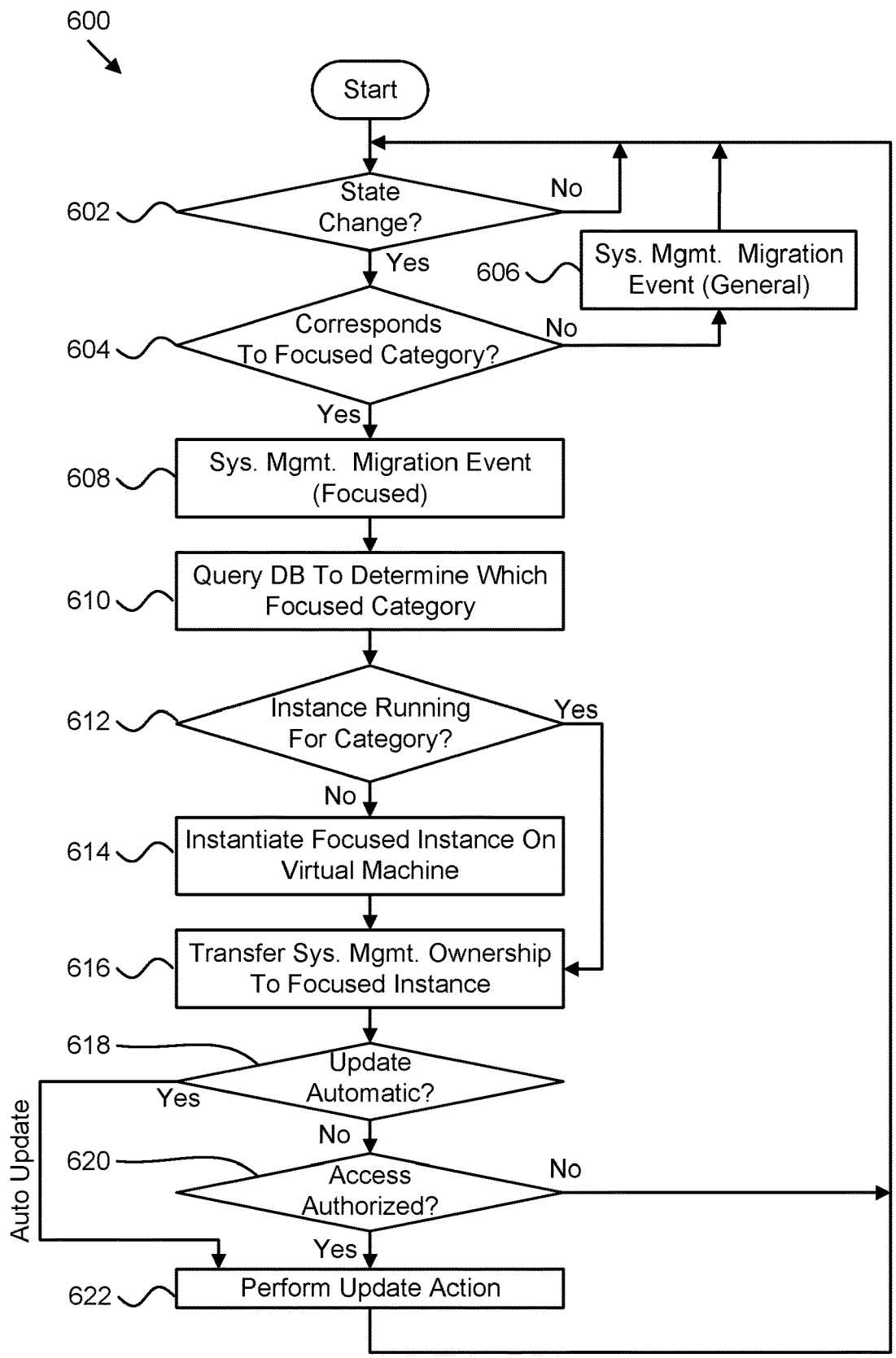
FIG. 6 is a schematic flow chart diagram illustrating another embodiment of a method for state-based system management migration.

FIG. 6 is a schematic flow chart diagram illustrating another embodiment of another method 600 for state-based system management migration. The method 600 begins and determines 602 the state of the data center component managed by a general system management instance. If the state has not changed, the method 600 continues monitoring the data center complement to determine whether the state has changed. If the state has changed, the method 600 determines the focused management category to which the state of the data center component corresponds by using the least a portion of the state to create a database of focused management categories where each focused management category has at least one predetermined update action to be performed on data center components having the state corresponding to the focused management category.

If the state of the data center component already corresponds to a general management category then no state change is detected at 602. On the other hand, if the method 600 determines 602 the state of a data center component that was already being managed by a focused system management instance, then the method 600 determines 604 that the state does not correspond to a focused management category any longer but instead correspond corresponds to a general system management category, whereby the method 600 in response generates 606 a general system management migration event which transfers system management ownership to the general system management instance.

If the state corresponds to a focused management category, the method 600 generates 608 a focused system management migration event. The method 610 determines the focused management category to which the state of the data center complement corresponds by using at least a portion of the state to create a database of focused management categories, or each focused management category has at least one predetermined update action to be performed on the data center components having the state corresponding to the focused management category. The method 600 ensures that an instance is running for the focused management category. If an instance is already running for the focused management category, the method 600 proceeds and transfers 616 system management ownership of the data center complement to the focused system management instance corresponding to the focused management category. If the method 600 determines 612 that the focused system management instance is not running, in certain embodiments, the method 600 instantiates 614 the focused system management instance on the virtual machine and transfers 616 system management ownership of the data center complement to the focused system management instance corresponding to the focused management category.

The method 600 determines 618 whether a predetermined update action is to be performed automatically. If the method 600 determines 618 that a predetermined update action is to be performed automatically, the method 600 proceeds and performs 622 the at least one predetermined update on the data center component for the focused management category. If the method 600 determines 618 that a predetermined update action is to be performed semi-automatically, i.e. in response to an instruction from a computer system, the method 600 continues and determines 620 whether the computer system providing the instruction is authorized to access the focused system management instance. If the method 600 determines 620 that the computer system is not authorized to access the focused system management instance, the method 600 returns and again determines 602 the state of the data center component. If the method 600 determines 620 that computer system is authorized to access the focused system management instance, the method 600 performs 622 the at least one predetermined update on the data center component for the focused management category. All or portions of the steps of the method 600 may be implemented using the state module 202, the event module 204, the run module 206, the transfer module 208, the mapping module 302, the update module 304, the access module 306, and/or the alert module 308.

In some embodiments, all or portions of the steps of the method 500 and/or the method 600 may be implemented in a computer program product. In one embodiment, the computer program product includes a non-transitory tangible computer readable medium having stored thereon computer program instructions that are configured to, when executed by a processor, cause the processor to perform operations including determining a state of a data center component, generating a focused management migration event in response to determining that the state of the data center component corresponds to a focused management category that differs from a general management category, ensuring, in response to detecting the focused management migration event, that a focused system management instance configured to manage data center components having the state corresponding to the focused management category is running, and transferring system management ownership of the data center component to the focused system management instance in response to detecting the focused management.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A controller comprising:
 a state module is to determine a state of a data center component;
 an event module is to electronically communicate with the state module and to generate a focused management migration event in response to the state module determining that the state of the data center component corresponds to a focused management category that differs from a general management category of data center components managed by a general system management instance;

a run module that is to ensure, in response to detecting the focused management migration event, that a focused system management instance is to manage data center components having the state corresponding to the focused management category is running;

a mapping module that is to determine the focused management category to which the state of the data center component corresponds by using at least a portion of the state to query a database of focused management categories, each focused management category having at least one predetermined update action to be performed on data center components having the state corresponding to the respective focused management category; and a transfer module that is to transfer, in response to detecting the focused management migration event, system management ownership of the data center component to the focused system management instance.

2. The controller of claim 1, wherein the event module is to generate a general management migration event in response to the state module determining that the state of the data center component managed by the focused system management instance corresponds to the general management category, and wherein the transfer module is to transfer, in response to detecting the general management migration event, system management ownership of the data center component to the general system management instance.

3. The controller of claim 1, wherein the focused management migration event is a first category management migration event, the focused system management instance is a first focused system management instance, and the focused management category is a first focused management category, wherein the event module is to generate a second category focused management migration event in response to the state module determining that the state of a second data center component corresponds to a second focused management category that differs from the first focused management category and different from the general management category, and wherein the transfer module is to transfer, in response to detecting the second category focused management migration event, system management ownership of the second data center component to the second category focused system management instance corresponding to the second focused management category.

4. The controller of claim 1, wherein the run module is to ensure that the focused system management instance for focused management category is running by instantiating the focused system management instance on a virtual machine in response to determining that the focused system management instance for the focused management category is not already running.

5. The controller of claim 1, wherein the focused management category is selected from pre-preproduction, troubleshooting, offline, throttled performance, high-priority, high-reliability, custom-configuration, temperature sensitive, and user-defined.

6. The controller of claim 1, wherein the focused system management instance is to perform the at least one predetermined update action on the data center component in response to the transfer of system management ownership.

7. The controller of claim 1, wherein the at least one predetermined update action is selected from an operating system update, a driver update, a security update, a hardware configuration update, a software configuration update, a usage limitation update, a notification update, and/or a user-defined update.

8. The controller of claim 6, wherein the update module is to perform the at least one predetermined update action automatically in response to the transfer of system management ownership.

9. The controller of claim 6, wherein the update module is to perform the at least one predetermined update action in response to an instruction from a computer system.

10. The controller of claim 9, further comprising an access module that is to grant the computer system access to the focused system management instance in response to determining that the computer system is authorized to cause the update module to perform the at least one predetermined update action.

11. The controller of claim 10, wherein the computer system is a remote computer system that is to communicate with the focused system management instance over a network external to a data center network.

12. The controller of claim 1, further comprising an alert module is to send an alert indicating that the system management ownership of the data center component is in the focused system management instance in response to the transfer module transferring system management ownership of the data center component, wherein the alert module is to send the alert after the state module has read the state of the data center component, the run module has ensured that the focused system management instance is running, and the transfer module has transferred system management ownership of the data center component.

13. A method comprising:

determining a state of a data center component;

generating a focused management migration event in response to determining that the state of the data center component corresponds to a focused management category that differs from a general management category of data center components managed by a general system management instance;

ensuring, in response to detecting the focused management migration event, that a focused system management instance is to manage data center components having the state corresponding to the focused management category is running;

mapping to determine the focused management category to which the state of the data center component corresponds by using at least a portion of the state to query a database of focused management categories, each focused management category having at least one predetermined update action to be performed on data center components having the state corresponding to the respective focused management category; and transferring system management ownership of the data center component to the focused system management instance in response to detecting the focused management migration event.

14. The method of claim 13, further comprising generating a general management migration event in response to determining that the state of the data center component managed by the focused system management instance corresponds to the general management category, and transferring system management ownership of the data center component to the general system management instance in response to detecting the general management migration event.

16. The method of claim 13, wherein ensuring that the focused system management instance for focused management category is running comprises instantiating the focused system management instance on a virtual machine in response to determining that the focused system management instance for the focused management category is not already running.

16. The method of claim 13, wherein the focused management category is selected from pre-preproduction, troubleshooting, offline, throttled performance, high-priority, high-reliability, custom-configuration, temperature sensitive, and user-defined.

17. The method of claim 16, further comprising performing at least one predetermined update action on the data center component in response to the transfer of system management ownership, wherein the at least one predetermined update action is selected from an operating system update, a driver update, a security update, a hardware configuration update, a software configuration update, a usage limitation update, a notification update, and/or a user-defined update.

18. A non-transitory tangible computer readable medium having stored thereon computer program instructions that are to, when executed by a processor, cause the processor to perform operations comprising:

determining a state of a data center component;
  generating a focused management migration event in response to determining that the state of the data center component corresponds to a focused management category that differs from a general management category;
  ensuring, in response to detecting the focused management migration event, that a focused system management instance is to manage data center components having the state corresponding to the focused management category is running;
  mapping to determine the focused management category to which the state of the data center component corresponds by using at least a portion of the state to query a database of focused management categories, each focused management category having at least one predetermined update action to be performed on data center components having the state corresponding to the respective focused management category; and
  transferring system management ownership of the data center component to the focused system management instance in response to detecting the focused management migration event.

* * * * *